US008762600B2

(12) United States Patent
Baskaran et al.

(10) Patent No.: US 8,762,600 B2
(45) Date of Patent: Jun. 24, 2014

(54) DIGITAL DELAY BUFFERS AND RELATED METHODS

(75) Inventors: Narayanan Baskaran, Malden, MA (US); Richard J. DiPasquale, Derry, NH (US); Jeffrey R. Towne, Litchfield, NH (US); Gary A. Turner, Lunenburg, MA (US)

(73) Assignee: Alcatel Lucent, Paris (FR)

( * ) Notice: Subject to any disclaimer, the term of this patent is extended or adjusted under 35 U.S.C. 154(b) by 1466 days.

(21) Appl. No.: 10/911,726

(22) Filed: Aug. 5, 2004

(65) Prior Publication Data

US 2006/0028902 A1   Feb. 9, 2006

(51) Int. Cl.
*G06F 3/00* (2006.01)
*G06F 5/00* (2006.01)

(52) U.S. Cl.
USPC .......................................................... 710/52

(58) Field of Classification Search
USPC .......................................................... 710/52
See application file for complete search history.

(56) References Cited

U.S. PATENT DOCUMENTS

| 5,461,622 | A |   | 10/1995 | Bleickardt et al. ............. 370/84 |
| 5,680,482 | A | * | 10/1997 | Liu et al. ........................ 382/233 |
| 5,748,901 | A | * | 5/1998  | Afek et al. ..................... 709/238 |
| 6,473,815 | B1 | * | 10/2002 | Lu et al. ......................... 710/52 |
| 6,633,565 | B1 | * | 10/2003 | Bronstein et al. ............. 370/392 |
| 6,872,601 | B1 | * | 3/2005  | Baxter et al. .................. 438/129 |
| 7,120,706 | B2 | * | 10/2006 | Zievers ............................ 710/6 |
| 2003/0046489 | A1 |   | 3/2003  | Yagi et al. ..................... 711/113 |
| 2003/0056146 | A1 | * | 3/2003  | Freeman et al. ................ 714/25 |

FOREIGN PATENT DOCUMENTS

| JP | 03 031946 | 2/1991 |
| JP | 08 202595 | 8/1996 |
| JP | 03 064228 | 3/2001 |
| JP | 2001 188715 | 7/2001 |
| WO | WO 93/18595 | 9/1993 |
| WO | WO 03/094479 | 11/2003 |

OTHER PUBLICATIONS

European Search Report dated Feb. 6, 2006.

* cited by examiner

*Primary Examiner* — Chun-Kuan Lee
(74) *Attorney, Agent, or Firm* — Capital Patent & Trademark Law Firm, PLLC

(57) ABSTRACT

A digital delay buffer may be provided with both a fast processing, small capacity memory section and a slow processing, large capacity memory section. The use of two memory sections allows the buffer to generate an aligned data stream with n-bit block level latencies from a plurality of delayed data portions, even if one of the portions is subjected to an undue delay.

19 Claims, 3 Drawing Sheets

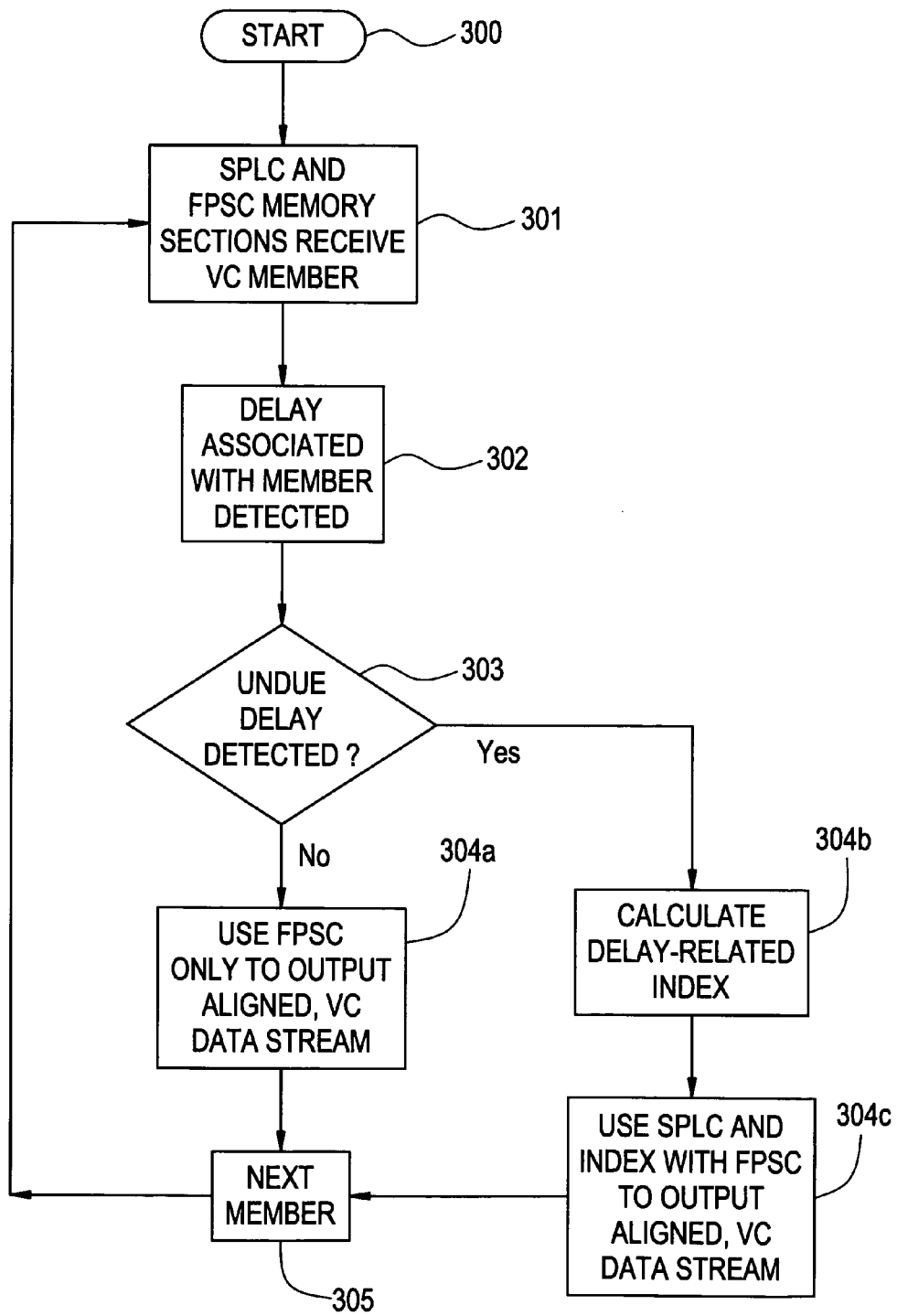

DIGITAL DELAY BUFFERS AND RELATED METHODS

BACKGROUND OF THE INVENTION

Today, many telecommunications service providers use synchronous optical networks (SONET) as a method of transporting data. Before being transported, data may be separated into a plurality of portions (e.g., parts, segments, etc.).

For example, Storage Area Networks (SANs) are used to store large amounts of data, such as financial transactions carried out by banks and other lending institutions. Typically, a SAN comprises a primary storage area and one or more backup storage areas. Usually the primary storage area is responsible for storing original transactions (which have been put into an electronic form) while the backup storage areas are responsible for storing copies of the original transactions in case, for some reason, the originals stored within the primary storage area are not accessible, have been corrupted or worst case, destroyed. Many times the primary and backup storage areas are not located in the same geographic location. Nonetheless, they are connected by a SONET compatible transport network such that when an original transaction is sent to the primary storage area, a copy may also be sent to one or more backup storage areas.

Due to a number of factors, one of which is the large amount of data which needs to be transferred between a primary storage area and a backup storage area, telecommunications service providers operating SONET-based networks prefer to transport data between storage areas as virtually concatenated (VC) data. More specifically, a service provider typically maps data from a SAN into a VC data stream. Thereafter, the VC data stream is further separated into a plurality of portions known as "members" and transported along the network. Telecommunications service providers are constantly looking for ways to transfer data more efficiently in order to conserve bandwidth and thereby (hopefully) increase profitability.

At a receiving end (e.g., storage area), a device is needed to take the many different members and align/combine (collectively referred to as "align") them into one data stream once again.

Sometimes one of the members has been, relatively speaking, subjected to an unexpectedly long delay. Such a delay may adversely affect the generation of an aligned data stream.

Existing attempts to control, offset or adjust (collectively referred to as "control") for such delays have been ineffective because the techniques used introduce their own substantial latency (i.e., processing) delays.

For example, one existing technique uses a slow processing large capacity ("SPLC") memory. Use of such an SPLC memory inherently creates latency delays. In more detail, the key attributes of any memory are throughput, access time, block size and capacity, where throughput is the average number of bits that can be written to, or read from, a memory in a unit of time; access time is the time needed to complete a read or write cycle; block size is the number of bits that are written to or read from the memory during a single access cycle; and capacity is the total number of bits a memory can store.

Typically, the larger the capacity of a given memory, the longer it takes to access the memory, i.e., the longer the access time. Accessing SPLCs using bigger block sizes will reduce the average access time per bit and improve throughput. However, the use of bigger block sizes increases inherent latency delays.

Accordingly, it is desirable to control the effects of unexpectedly long delays (sometimes referred to as "differential delays") between arriving members, and more generally between arriving portions of a data stream, in order to generate an aligned data stream without incurring the latency delays associated with existing techniques.

SUMMARY OF THE INVENTION

We have recognized that latency delays can be controlled (e.g., fixed, capped) through the use of a digital data stream delay buffer (hereafter, "digital delay buffer") which includes both a fast processing, small capacity ("FPSC") memory section and an SPLC memory section.

The use of two memory sections provides the delay buffers of the present invention with the ability to control latency delays.

In one exemplary embodiment, both memory sections may receive one or more data portions. Upon receiving the portions, an associated control section is operable to detect a delay associated with each portion. Depending on the value of the detected delays, the control section will determine whether or not the SPLC memory section is needed to generate an aligned data stream, it being understood that the FPSC is always used to generate the aligned data stream. This effectively acts as a control on latency delays. If none of the values exceeds a time period equivalent to a time period at which the memory capacity of the FPSC memory section reaches a maximum, then there is no need to use the SPLC memory section. On the other hand, if one or more of the values exceeds the time period, then it may be necessary to use the SPLC memory section. More particularly, it may be necessary to use data (i.e., members of a VC digital data stream) stored in the SPLC memory section to generate the aligned data stream. Even when the SPLC memory section is used latency delays are controlled to levels which do not exceed those available using existing techniques.

BRIEF DESCRIPTION OF THE DRAWINGS

FIG. 3 depicts a simplified flow diagram of a technique for generating an aligned, data stream according to one embodiment of the present invention.

DETAILED DESCRIPTION OF THE INVENTION

Figure 1:
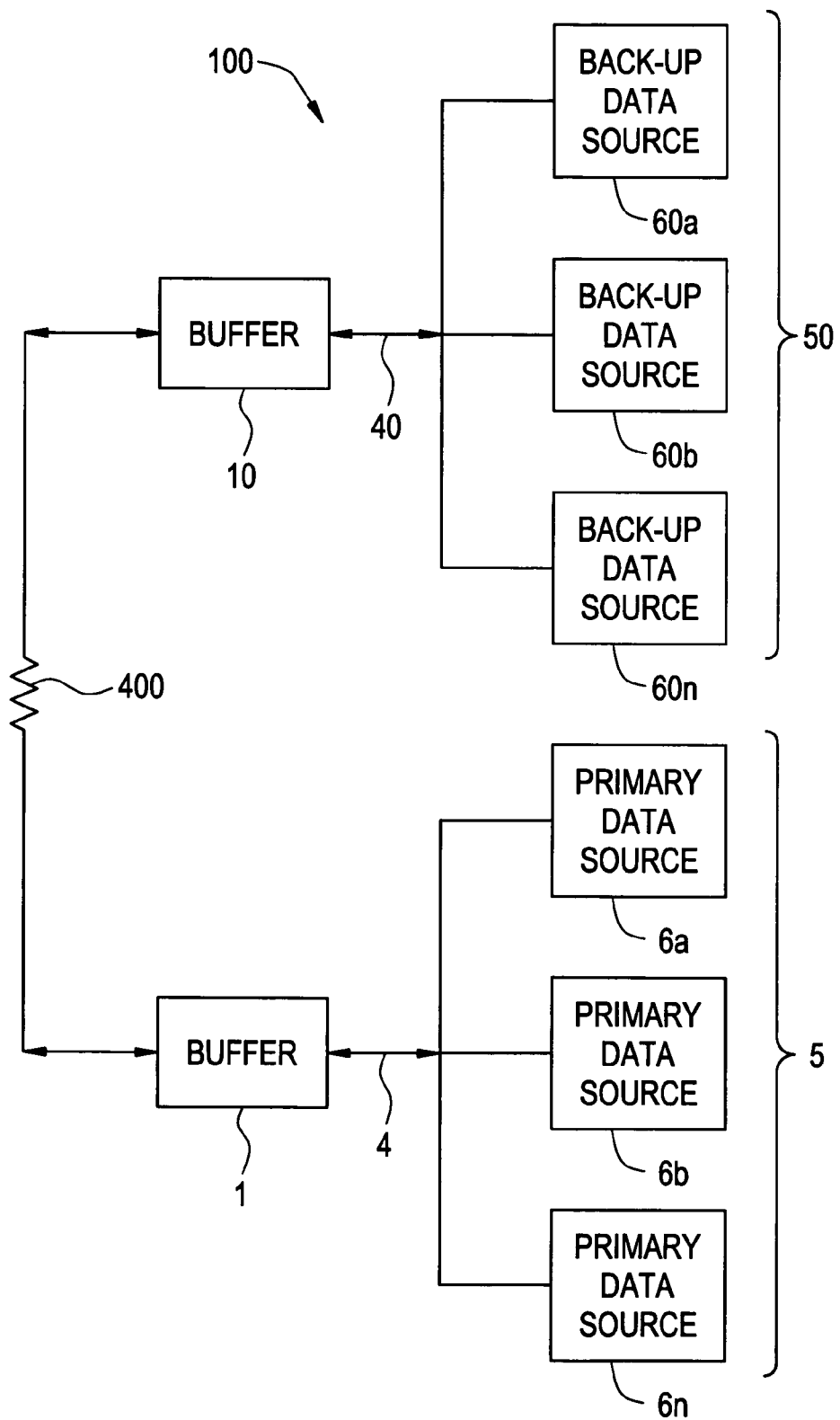
FIG. 1 depicts a block diagram of a network which includes digital delay buffers according to one embodiment of the present invention.

Referring now to FIG. 1, there is shown a network 100 which comprises primary data source 5 made up of one or more primary data source sections 6a, 6b, . . . 6n (where "n" indicates the last storage section) and secondary data source 50 which comprises one or more secondary data source sections 60a, 60b, . . . 60n. In one embodiment of the present invention, the primary and secondary data sources 5,50 comprise primary and backup data source sections or storage areas of a SAN. Also shown in FIG. 1 are digital data delay buffers 1,10. In general, data stored in one of the primary or backup storage sections needs to be transferred. To do so, this data may be transported as a number of data portions. As is known by those skilled in the art, when such portions are initially created, an original aligned VC data stream is broken up into a number of different, aligned portions or members (the term "members" will be used when speaking of a VC data stream, it being understood that this is only one type of data stream which may be used by the present invention). After being transported from one storage area to another over the SONET network 400, members may become unaligned because each may not follow the same path. At the receiving end, therefore, the members must be realigned (or aligned) by one of the digital delay buffers 1,10 before being sent to either the primary data source 5 or back-up data source 50.

Before continuing, though FIG. 1 depicts the use of a SAN as the source of data and network 400 as a SONET network, it should be understood the present invention may be used to control latency delays associated with a number of different data source types and a number of network types. For the sake of simplifying the explanation which follows, storage areas of a SAN and a SONET network have been chosen as examples of a data source and network, respectively.

To further simplify the discussion which follows, the operation of the digital delay buffer 10 will be described, it being understood that the operation of digital delay buffer 1 is similar in nature.

Figure 2:
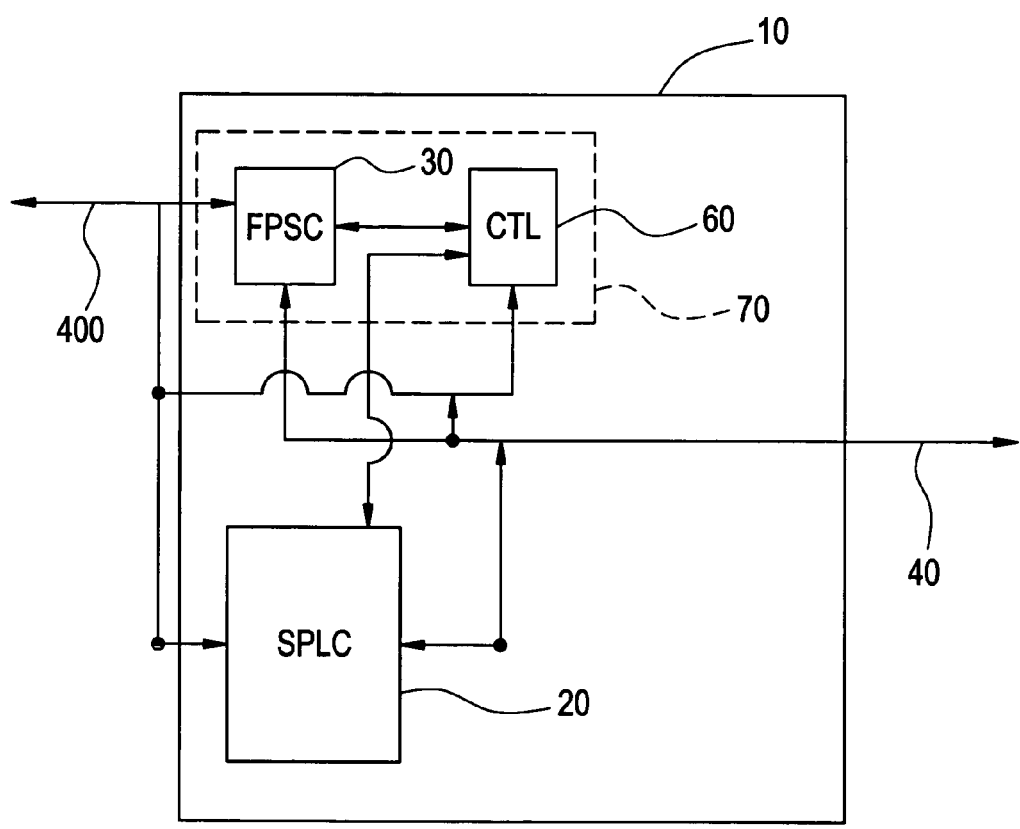
FIG. 2 depicts a simplified block diagram of a digital delay buffer according to one embodiment of the present invention.

Referring now to FIG. 2, there is shown a block diagram of digital delay buffer 10. Buffer 10 is shown comprising a SPLC memory section 20, a FPSC memory section 30 and a control section 60. Though shown as three separate units, it should be understood that one or more of these units may be combined to form fewer units or further broken down to form additional units. In one embodiment of the present invention, the digital delay buffer 10 shown in FIG. 2 operates as follows (see the flowchart in FIG. 3 as well).

One or more VC members representing an original aligned, VC data stream may be received by the digital delay buffer 10 along pathway or pathways 400. Though not shown in FIG. 2, the digital delay buffer 10 may also comprise input/output sections for appropriately receiving and transmitting data. Upon receiving the one or more VC members, the buffer 10 may be operable to forward these members to both the SPLC memory section 20 and the FPSC memory section 30. Substantially at the same time, the control section 60 is operable to detect a delay associated with each of the received members. Because each of the members may have traversed a different path between its originating source and the buffer 10, one or more of the members may have been subjected to different delays. It is the job of the control section 60 to detect such delays. Though not shown in detail within FIG. 2, it should be understood that the control section 60 comprises the necessary circuitry and software/firmware to detect and process such delays. After detecting the delays, the control section 60 is further operable to determine whether or not the SPLC memory section 20 is needed to generate an aligned data stream from the received VC members.

In one embodiment of the present invention, the control section 60 is operable to allow the FPSC memory section 30 to generate and output an aligned data stream which is formed from the one or more received VC members without using data stored in the SPLC memory section 20 provided none of the detected delays exceeds a time period that is equivalent to a time period at which a memory capacity of the FPSC memory section reaches a maximum (collectively referred to as an "undue delay").

Said another way, as long as none of the members has been subjected to an undue delay, they each will arrive at the FPSC memory section 30 within a time period that is less than a time period it takes for the FPSC memory section 30 to reach its maximum memory capacity. This ensures that when the FPSC memory section 30 begins to generate an aligned data stream, it has received all of the separate VC members. If no members have been subjected to an undue delay the control section 60 may effectively control the latency delays associated with generating an aligned data stream such that smaller delays than previously thought possible may be realized by using the FPSC memory section 30.

However, if for some reason, one of the individual VC members has been subjected to an undue delay, its arrival at the FPSC memory section 30 may be delayed for a time period that exceeds the time period it takes for the FPSC memory section 30 to reach its maximum capacity.

In more detail, when a member is delayed, the FPSC memory section 30 continues to receive other VC members. By the time a delayed member arrives at the FPSC memory section 30, section 30 may have already reached its maximum memory capacity. In effect, there is no room to store the late-arriving member without loosing data. Still further, if the memory section 30 were to attempt to generate an aligned data stream before receiving a member that has been unduly delayed, the so-generated data stream would not accurately represent an original, aligned VC data stream.

For these reasons, the control section 60 is operable to detect whether any of the received members have been subjected to undue delay to control the proper generation of an aligned data stream.

If, in fact, one of the members has been subjected to an undue delay, then the control section 60 is operable to allow the FPSC memory section 30 to output an aligned data stream, this time, however, using an adjustable amount of data stored in the SPLC memory section 20. That is, when the control section 60 detects a delay which exceeds the time period it takes for the FPSC memory section 30 to reach its maximum memory capacity, an aligned data stream should be generated using some data which has been stored within the SPLC memory section 20.

For example, as was indicated above, all of the arriving, VC members may be received by both memory sections 20,30. Therefore, at any given instant of time, all of the members may be stored within each of the memory sections 20,30. Some members arrive faster than others, however. Though the earlier (or faster) arriving members may have already been stored within both sections 20,30, what remains is for the slower members to arrive. Instead of allowing the FPSC memory section 30 from reading out an incorrectly aligned VC data stream, the control section 60 is further operable to, in effect, withhold the output of an aligned data stream based only on the earlier arriving members until the late arriving members have arrived. This holding involves the use of the SPLC memory section 20.

Though the terms "holding" or "withholding" are used above with respect to the output of an aligned data stream, it should be understood that these terms are merely descriptive. In fact, the aligned data stream is not withheld. Rather, the early arriving members making up the eventual aligned data stream are selected from the slower processing SPLC memory section 20. In effect, the aligned data stream is created by using early arriving members which are slowly processed.

Said another way, because the SPLC memory section 20 processes data streams slower than memory section 30, its processing speed inherently creates a delay or a holding time as compared to the FPSC memory section 30. When the control section 60 detects that one of the members has been subjected to a delay, it is further operable to determine if this delay exceeds the time it takes for the FPSC memory section 30 to reach a maximum capacity. If a delay exceeds the time period, then the control section 60 is yet further operable to determine how long to "withhold" an aligned data stream. To do so, the control section 60 effectively converts the undue delay associated with the delayed member(s) into an amount of memory within SPLC memory section 20.

Before going further, it should be understood that even though the present invention controls latency delays to control the effects of undue delays on VC members, the continuous transfer of data over SONET network 400 remains intact and unaffected.

In even more detail, because the SPLC memory section 20 stores data at a certain rate, a delay time period can be converted into an amount of data stored in SPLC memory section 20. In a further embodiment of the present invention, the amount of data can be represented by an "index" generated by the control section 60. This index can be used by control section 60 to identify the amount of data from the earlier arriving members stored within the SPLC memory section 20 that is needed to control the effect of any undue delay.

After generating an index, the control section 60 sends instructions to read out an amount of data from the SPLC memory section 20 associated with the index. By the time the data has been read out from the SPLC memory section 20, the last member will have arrived. As the last, late-arriving member arrives at the FPSC memory section 30, the memory section 30 will also be receiving the data read out from the SPLC memory section 20. As far as the memory section 30 is concerned, all of the data (i.e., members) appear(s) to arrive at the same time. Because all of the members arrive at the same time, the memory section 30 is able to accurately generate an aligned data stream.

By using a combination of a FPSC and a SPLC memory section, digital delay buffers of the present invention provide the ability to generate aligned data streams with latency delays that range from the processing time of the FPSC to the capacity (time equivalent) of the SPLC.

It should be noted that the present inventions do not require the transfer of any instructions (e.g., switching instructions) between the two memory sections 20,30. For example, some existing techniques exchange a switching message between memory sections when an undue delay is detected. Such a switching message or instruction typically instructs an SPLC to carry out the generation of an aligned data stream without the use of an FPSC or vice-versa. The time it takes to effectively send and receive a switching message and then switch memories only adds to any latency delay. Instead, in the present invention each memory section 20,30 may receive each of the members without receiving a message associated with the other memory section because, for example, the control section 60 is able to determine if the SPLC memory section 20 is to be used to generate an aligned data stream.

It should also be understood that the control section 60 may comprise one or more programs which may be written in a number of program languages and may comprise software or firmware or some combination of the two. The control section 60 may also comprise hardware, such as a computer readable medium, a microprocessor, a digital signal processor or one or more memory sections. In any event, the control section 60 is capable of carrying out a series of instructions for both detecting delays associated with the members and controlling the memory sections 20,30 to output a correct, aligned data stream. A simplified flowchart highlighting the various steps in generating an aligned data stream according to the present invention is shown in FIG. 3.

Again, though the above discussion has focused on the use of digital delay buffers in SONET-based transport networks, it should be understood that this is only one example of an application for the novel digital delay buffers of the present invention. In general, any application which requires the generation of a single aligned digital data stream from multiple data portions, where one or more of the multiple portions have been subjected to a undue delay, may make use of the novel digital delay buffers of the present invention.

Backtracking somewhat, it was mentioned above that it may be necessary to use data stored in the SPLC memory section 20. When this occurs, the control section 60 generates an index in order to identify an amount of data needed to be read out from memory section 20. In yet a further embodiment of the present invention, this index is adjustable in order to account for the variable nature of any undue delay. The specific index needed will be directly related to the amount of data needed to offset an undue delay that a member(s) has been subjected to.

Perhaps an analogy will help. The SONET network 400 can be represented by a number of train tracks between two cities. Each track is designed to allow the passage of a single train. At some start time, each of the trains departs a beginning or source station at substantially the same time.

At the receiving or destination station, the earliest arriving trains can be equated to the earliest arriving members to buffer 10. As each of the trains arrives, a station manager must extract cargo from the same numbered car (VC member) of each train. For example, suppose car #30 within each train carries coal. To effectively combine all of the cars carrying coal into one car of coal, the station manager must wait until the last arriving train arrives and then extract coal from car #30. However, on one particular day it happens that one of the trains has been unduly delayed. Therefore, instead of proceeding to create the one car of coal without the missing train and its car, the station manager chooses to direct the earliest arriving trains and their cars to side rails to await the last arriving train and its car. Once the last arriving train and its car arrives, the station manager is allowed to extract the coal from the car #30 to form one car full of coal. In a similar manner, the station manager repeats this process for each type of car until one long train, which contains cars in a properly aligned order, is created.

The side rails, in effect, equate to the SPLC memory section 20.

Similarly, the control section 60 may act as a station manager and select an index which determines the amount of data (e.g., number of members and their data) needed from the SPLC memory section 20 to generate an aligned data stream when the last member has arrived at the FPSC memory section 30. Because the late arriving members may be subject to different delays, the index selected and data needed must also vary. To vary the amount of data required, the control section 60 can be said to generate a variable index. For this reason, the digital delay buffers of the present invention may be referred to as variable, digital delay buffers.

There may be many ways in which the control section 60 may detect the delays associated with each of the incoming VC members. For example, each SONET frame typically has a start marker and a fixed size. By detecting the time it takes between the arrival of start markers, control section 60 may be able to detect whether a member has been delayed or, in effect, how much a member has been delayed. In even more detail, each member contains a so-called "H4" byte which in turn contains a multi-frame indicator ("MFI") value. Before transmission along network 400, each member is set to the same MFI value. Upon receipt by buffer 10, control section 60 is operable to compare the MFI value of each member to determine if a delay has occurred. It should be understood that other techniques may be used to detect delays associated with each of the members.

In yet a further embodiment of the present invention, delays may be detected on an n-bit block level basis. The control section 60 may be operable to generate indices that equate to n-bit block level latency delays. The ability to generate an aligned data stream using n-bit block level latencies (which are substantially smaller than existing frame level latencies) is one of the advantages that may be realized by using the present invention over existing techniques.

As was indicated before, memory sections 20,30 and control section 60 may be combined to form fewer sections or further broken down to form additional sections. In one embodiment of the present invention, the FPSC memory section 30 and control section 60 are part of an application-specific integrated circuit or ASIC. In yet another embodiment of the present invention, the FPSC memory section 30 and control section 60 are part of a field programmable gate array or FPGA. Typically, the FPSC memory section 30 and control section 60 may be considered internal components to such an ASIC or FPGA, while the SPLC memory section 20 may be considered an external component to such an ASIC or FPGA.

As noted before, it should be understood that buffer 1 may operate in a substantially similar manner as buffer 10. Additionally, when data sources 5,50 comprise SANs, it should be understood that the one or more VC members which are being transported along network 400 may originate from a primary storage area 5 or back-up storage area 50. These storage areas may comprise one or more optical disk arrays for storing any number of different types of data, including original financial transactions (in the primary storage area 5) and/or copies of data associated with an original financial transaction (in back-up storage area 50).

In yet an additional embodiment of the invention, though it may be necessary to select data from SPLC memory section 20, it may not be necessary to select data associated with the last arriving member. This is because such a member (or members) arrives at the FPSC memory section 30 substantially at the same time it arrives at the SPLC memory section 20; so there is no need to select data associated with the last arriving member from SPLC memory section 20.

The foregoing has sought to set forth some examples illustrating the present invention. Others may be envisioned and still remain within the scope of the present invention which is better defined by the claims which follow.

We claim:

1. A digital data stream delay buffer comprising:
 a fast processing, small capacity (FPSC) memory section operable to receive one or more delayed data portions of an original data stream;
 a slow processing, large capacity (SPLC) memory section operable to receive one or more delayed data portions of the original data stream; and
 a control section connected to each of the memory sections and operable to,
  detect a delay associated with each of the received delayed data portions,
  control the FPSC memory section to output an aligned data stream, having substantially the same alignment as an alignment associated with the original data stream, formed from the one or more delayed data portions without using data stored in the SPLC memory section, on the condition that none of the detected delays exceeds a time period equivalent to a time period at which a memory capacity of the FPSC memory section reaches a maximum, and
  control the FPSC memory section to output the aligned data stream using a selected, variable amount of data stored in the SPLC memory section on the condition that one or more of the detected delays exceeds the time period,
 wherein the FPSC memory section contains a first data portion of the original data stream and the SPLC memory section contains a second data portion of the original data stream, and the first data portion is identical to the second data portion.

2. The buffer as in claim 1 wherein a memory capacity of the SPLC memory section is substantially larger than a memory capacity of the FPSC memory section.

3. The buffer as in claim 1 wherein a processing speed of the FPSC memory section is substantially faster than a processing speed of the SPLC memory section.

4. The buffer as in claim 1 wherein each of the one or more delayed data portions comprises a member of a virtual concatenated (VC) data stream.

5. The buffer as in claim 1 wherein the FPSC memory section is further operable to output the aligned data stream without receiving a message associated with the SPLC memory section.

6. The buffer as in claim 1 wherein the original data stream originates from a storage area network.

7. The buffer as in claim 6 wherein the storage area network comprises an optical disk array.

8. The buffer as in claim 6 wherein the storage area network comprises a storage area network for storing data associated with original financial transactions.

9. The buffer as in claim 6 wherein the storage area network comprises a storage area network for storing a copy of data associated with an original financial transaction.

10. A digital data stream delay buffer comprising:
 a fast processing, small capacity (FPSC) memory section operable to receive one or more delayed data portions of an original data stream; and
 a control section operable to,
  detect a delay associated with each of the received delayed data portions,
  control the FPSC memory section to output an aligned data stream, having substantially the same alignment as an alignment associated with the original data stream, formed from the one or more delayed data portions without using data stored in a SPLC memory section, on the condition that none of the detected delays exceeds a time period equivalent to a time period at which a memory capacity of the FPSC memory section reaches a maximum, and
  control the FPSC memory section to output the aligned data stream using a selected, variable amount of data stored in the SPLC memory section on the condition that one or more of the detected delays exceeds the time period,
 wherein the FPSC and SPLC memory sections each contain a same data portion of the original data stream.

11. A digital data stream delay buffer comprising:
 a slow processing, large capacity (SPLC) memory section operable to receive one or more delayed data portions of an original data stream, and to output a selected, variable amount of data representing the one or more portions on the condition that one or more of the received portions has been subjected to a delay that exceeds a time period equivalent to a time period at which a memory capacity of a fast processing, small capacity (FPSC) memory section reaches a maximum, wherein the FPSC memory section contains a first data portion of the original data stream and the SPLC memory section contains a second data portion of the original data stream, and the first data portion is identical to the second data portion.

12. A method for generating an aligned data stream comprising:
receiving one or more delayed data portions of an original data stream at a fast processing, small capacity (FPSC) memory section;
receiving one or more delayed data portions of the original data stream at a slow processing, large capacity (SPLC) memory section; and
detecting a delay associated with each of the received delayed data portions using a control section, the method further comprising,
outputting from the FPSC memory section an aligned data stream, having substantially the same alignment as an alignment associated with the original data stream, formed from the one or more delayed data portions without using data stored in the SPLC memory section, on the condition that none of the detected delays exceeds a time period equivalent to a time period at which a memory capacity of the FPSC memory section reaches a maximum, and
outputting from the FPSC memory section the aligned data stream using a selected, variable amount of data stored in the SPLC memory section on the condition that one or more of the detected delays exceeds the time period,
wherein the FPSC memory section contains a first data portion of the original data stream and the SPLC memory section contains a second data portion of the original data stream, and the first data portion is identical to the second data portion.

13. The method as in claim 12 wherein a memory capacity of the SPLC memory section is substantially larger than a memory capacity of the FPSC memory section.

14. The method as in claim 12 wherein a processing speed of the FPSC memory section is substantially faster than a processing speed of the SPLC memory section.

15. The method as in claim 12 wherein each of the one or more delayed data portions comprises a member of a virtual concatenated (VC) data stream.

16. The method as in claim 12 further comprising outputting the aligned data stream by the FPSC memory section without receiving a message associated with the SPLC memory section.

17. The method as in claim 12 wherein the original data stream originates from a storage area network.

18. A method for generating an aligned data stream comprising:
receiving one or more delayed data portions of an original data stream at a fast processing, small capacity (FPSC) memory section;
detecting a delay associated with each of the received delayed data portions by a control section, the method further comprising,
outputting from the FPSC memory section an aligned data stream, having substantially the same alignment as an alignment associated with the original data stream, formed from the one or more delayed data portions without using data stored in a SPLC memory section, on the condition that none of the detected delays exceeds a time period equivalent to a time period at which a memory capacity of the FPSC memory section reaches a maximum, and
outputting from the FPSC memory section the aligned data stream using a selected, variable amount of data stored in the SPLC memory section on the condition that one or more of the detected delays exceeds the time period,
wherein both the FPSC and SPLC memory sections contain at least some data portions, that are identical to each other, from the original data stream.

19. A method for generating an aligned data stream comprising:
receiving one or more delayed data portions of an original data stream at a slow processing, large capacity (SPLC) memory section,
outputting a selected, variable amount of data representing the one or more portions from the SPLC memory section on the condition that one or more of the received portions has been subjected to a delay that exceeds a time period equivalent to a time period at which a memory capacity of an fast processing, small capacity (FPSC) memory section reaches a maximum, wherein the FPSC and SPLC memory sections each contain a same data portion from the original data stream.

* * * * *